(12) United States Patent
Mirassou

(10) Patent No.: US 10,816,365 B2
(45) Date of Patent: Oct. 27, 2020

(54) METHOD FOR AUTOMATICALLY CALIBRATING A CAMSHAFT SENSOR FOR A MOTOR VEHICLE ENGINE AND ASSOCIATED SENSOR

(71) Applicants: Continental Automotive France, Toulouse (FR); Continental Automotive GmbH, Hannover (DE)

(72) Inventor: David Mirassou, Toulouse (FR)

(73) Assignees: Continental Automotive France, Toulouse (FR); Continental Automotive GmbH, Hannover (DE)

(*) Notice: Subject to any disclaimer, the term of this patent is extended or adjusted under 35 U.S.C. 154(b) by 335 days.

(21) Appl. No.: 15/778,844

(22) PCT Filed: Nov. 18, 2016

(86) PCT No.: PCT/EP2016/001931
§ 371 (c)(1),
(2) Date: May 24, 2018

(87) PCT Pub. No.: WO2017/088968
PCT Pub. Date: Jun. 1, 2017

(65) Prior Publication Data
US 2018/0356256 A1  Dec. 13, 2018

(30) Foreign Application Priority Data

Nov. 25, 2015 (FR) .................................... 15 61387

(51) Int. Cl.
*G01D 5/244* (2006.01)
*G01D 5/14* (2006.01)
(Continued)

(52) U.S. Cl.
CPC .......... *G01D 5/2448* (2013.01); *G01D 5/145* (2013.01); *G01D 5/24471* (2013.01); *G01D 18/002* (2013.01); *G01M 15/06* (2013.01)

(58) Field of Classification Search
CPC ............. G01D 5/2448; G01D 18/002; G01D 5/24471; G01M 15/06
See application file for complete search history.

(56) References Cited

U.S. PATENT DOCUMENTS 5,546,268 A * 8/1996 Hurley ................ H01H 47/325
                                                        361/154
5,917,320 A * 6/1999 Scheller .................. G01D 3/02
                                                        324/166
(Continued)

FOREIGN PATENT DOCUMENTS

CN    1269886 A    10/2000
CN    1867813 A    11/2006
(Continued)

OTHER PUBLICATIONS

Computer translation of FR2985035 to Larue et al., downloaded from Espacenet on Jun. 11, 2020 (Year: 2013).*

(Continued)

*Primary Examiner* — Gregory J Toatley, Jr.
*Assistant Examiner* — Lyudmila Zaykova-Feldman
(74) *Attorney, Agent, or Firm* — RatnerPrestia

(57) ABSTRACT

A method for automatically calibrating an engine camshaft sensor, the sensor measuring variations in magnetic field value and delivering an electrical signal having a high state after the passage of the values of the magnetic field above the switching threshold on a rising edge and a low state after the passage of the values of the magnetic field below the switching threshold on a falling edge. After the passage of the values of the magnetic field above the switching threshold and measuring a new maximum value, the electrical (Continued)

signal remains in a high state as long as the magnetic field values are higher than a hysteresis threshold, which is dependent on the amplitude of the magnetic field calculated with the measured new maximum value; after the passage of the values of the magnetic field below the hysteresis threshold, a new switching threshold is calculated according to the new maximum value.

4 Claims, 3 Drawing Sheets

(51) Int. Cl.
    *G01D 18/00*     (2006.01)
    *G01M 15/06*     (2006.01)

(56) References Cited

U.S. PATENT DOCUMENTS

| | | |
|---|---|---|
| 6,109,097 A | 8/2000 | Conrads et al. |
| 2003/0110008 A1 | 6/2003 | Shirai et al. |
| 2005/0114053 A1 | 5/2005 | Southward et al. |
| 2006/0021238 A1 | 2/2006 | Sato et al. |
| 2006/0089818 A1 | 4/2006 | Norell et al. |
| 2008/0079422 A1 | 4/2008 | Tiemann |
| 2010/0231202 A1 | 9/2010 | Scheller et al. |
| 2011/0089930 A1 | 4/2011 | Eckrich et al. |
| 2012/0025811 A1 | 2/2012 | Harada |
| 2012/0249126 A1 | 10/2012 | Friedrich et al. |
| 2012/0262155 A1* | 10/2012 | Donovan .............. G01P 3/4802 324/207.2 |
| 2013/0293221 A1 | 11/2013 | Mialtu et al. |
| 2014/0195186 A1 | 7/2014 | Carbonne et al. |
| 2015/0070001 A1 | 3/2015 | Villaret |

FOREIGN PATENT DOCUMENTS

| | | |
|---|---|---|
| CN | 101010564 A | 8/2007 |
| CN | 101023324 A | 8/2007 |
| CN | 101153792 A | 4/2008 |
| CN | 102057254 A | 5/2011 |
| CN | 102346045 A | 2/2012 |
| CN | 102388316 A | 3/2012 |
| CN | 103443591 A | 12/2013 |
| CN | 103842839 A | 6/2014 |
| CN | 104169685 A | 11/2014 |
| CN | 104285129 A | 1/2015 |
| DE | 10046147 C1 | 2/2002 |
| FR | 2985035 A1 | 6/2013 |
| SU | 932202 A1 | 5/1982 |
| WO | 2013017211 A1 | 2/2013 |

OTHER PUBLICATIONS

International Search Report and Written Opinion for International Application No. PCT/EP2016/001931, dated Feb. 8, 2017, 6 pages.
Chinese Office Action for Chinese Application No. 201680079867.8, dated Mar. 6, 2019 with translation, 9 pages.

* cited by examiner

METHOD FOR AUTOMATICALLY CALIBRATING A CAMSHAFT SENSOR FOR A MOTOR VEHICLE ENGINE AND ASSOCIATED SENSOR

CROSS REFERENCE TO RELATED APPLICATIONS

This application is the U.S. National Phase Application of PCT International Application No. PCT/EP2016/001931, filed Nov. 18, 2016, which claims priority to French Patent Application No. 1561387, filed Nov. 25, 2015, the contents of such applications being incorporated by reference herein.

FIELD OF THE INVENTION

The present invention relates to a method for automatically calibrating a camshaft sensor for a motor vehicle. More particularly, it is a matter of determining automatically the "out-of-roundness" of a toothed wheel (also referred to as target) mounted on the end of a motor vehicle engine camshaft.

BACKGROUND OF THE INVENTION

Camshaft sensors are used in a motor vehicle to determine the position of the various cylinders in the engine combustion cycle, namely to determine whether each cylinder is in the admission phase, the compression phase, the combustion phase or the exhaust phase. These sensors generally comprise a magnetic field generator (for example: a permanent magnet), a means of detecting the magnetic field (Hall-effect cell, magnetoresistive MR cell, giant magnetoresistive GMR cell, etc. for example) and an electronic circuit for processing the signal received by the means of detecting the magnetic field. These sensors, which are referred to as active sensors, deliver a digital signal to a central processor for processing.

The magnetic field generator may also be the target, made of a magnetic material, exhibiting an alternation of south poles and north poles. In that case, the sensor may or may not incorporate a permanent magnet, depending on the means of detection used. Hereinafter, the south and north poles will be likened to the teeth and troughs of a mechanical target.

In the known way, a camshaft sensor is associated with a target attached to a camshaft. This target takes the form of a disk, the periphery of which is toothed. These teeth have the same height but different spacings (troughs) and lengths, so as to perform encoding (known per se) of the position of the cylinders in the combustion engine combustion cycle for a motor vehicle.

The means of detecting the magnetic field, which is present in the sensor, detects the passage of the teeth of the target past it and the resulting signal makes it possible to determine the position of each cylinder with respect to the engine combustion cycle, in a way known per se.

In order to determine the position of each cylinder in the engine cycle the curve of the variations in the value of the magnetic field perceived by the camshaft sensor during a revolution of the target is observed. This curve exhibits a series of humps, each corresponding to one tooth of the target. By measuring the spacing between each of the humps and the duration of each, it is possible to determine the position of each cylinder with respect to the engine combustion cycle. In order to do this it is therefore important to guarantee the precision of the position of the electrical edges of the signal generated by the sensor with respect to the position of the mechanical edges of the target. Each of these electrical edges is indicative of the passage of the mechanical edges of a tooth. The objective is to reduce to a minimum the phase shift in the signal caused by the fact that the sensor and the target are variably separated from one another. The electrical signal generated by the sensor changes state (high or low) when the magnetic signal crosses a predetermined switching threshold proportional to its amplitude. In order to do this, this switching threshold is fixed (at, for example, 75% of the amplitude, which corresponds to an optimum with regard to the precision between the electrical/mechanical edges for most existing targets) in order to determine the instant at which each edge defining a tooth passes. Thus, as soon as a first maximum and a first minimum of the perceived magnetic field are detected, it is determined what switching threshold value corresponds to 75% of this amplitude, and it is considered that a falling edge is being detected if the measured value of the magnetic field drops below this threshold value and, conversely, that a rising edge is being detected if the measured value of the magnetic field rises above this switching threshold value (or vice versa).

By proceeding in this manner, the moment of detection of the edge is optimized. However, this method presupposes that all the teeth have the same height and that there is no defect in geometry (sensors and target). Now, the sensors have the disadvantage of being sensitive to the positioning of the target on the camshaft and to the geometry of this target.

For cost reasons, the targets, which are simple pieces of metal equipped with teeth of predetermined dimensions and predetermined spacings, are mass-produced and often exhibit imperfect geometry. In particular, the teeth do not always have the same height in relation to the center of the target. This defect is what is referred to as "out-of-roundness". It has the effect that the upper part of each tooth of the target is not positioned on the same circle centered on the camshaft. Hence the term "out-of-roundness" used to describe this problem. An out-of-roundness of the mounting of the target on the camshaft may be added to this out-of-roundness in the manufacture of the target. There are also defects with the air gap between the sensor and the target, these defects varying with time and being sensitive to temperature.

Of course, because the camshaft sensor measures variable values in the magnetic field created by the passage of the teeth past it, if one tooth is lower (or taller) than the others, the separation between this tooth and the sensor varies in comparison with the other teeth and leads to a variation in the detected magnetic field. These variations in magnetic field may impair the measurements taken (impair the precision of the position of the electrical edges in relation to the mechanical edges) or may even fail to be interpreted by the sensor (non-detection of a tooth, the magnetic field being below the switching threshold). The signal delivered by the camshaft sensor is then erroneous and correct determination of the position of each cylinder in the engine cycle is corrupted or even impossible.

In order to alleviate these phenomena of "out-of-roundness" and/or of "airgap defect", it is known practice in the prior art to calibrate the magnetic field detection means to take account of this "out-of-roundness" and/or of this "airgap defect" and thus deliver a corrected measurement (better electrical/mechanical edge precision and elimination of the risk of non-detection of a tooth) to the central processor tasked with determining the position of each cylinder in the engine cycle.

To this end, the switching threshold is recalculated after the passage of the maximum and of the minimum of each new tooth, according to the calculated new amplitude of the magnetic field upon each passage of a tooth past the sensor.

The switching threshold is therefore recalculated after each passage of a tooth, according to the last maximum and the last minimum measured for the magnetic field. However, this method of automatically calibrating a camshaft sensor of the prior art has one major disadvantage. Specifically, in order to validate the last maximum or the last minimum measured, the switching threshold is recalculated only after a hysteresis triggered on passing the last maximum or the last minimum measured.

The hysteresis is a value of the magnetic field which is dependent on the new amplitude calculated on passing the last extremum. This will be referred to as the "hysteresis threshold".

When a new extremum is measured, the new amplitude of the magnetic field is calculated with this new extremum, then the value of the hysteresis threshold is calculated, the value of which, is a fraction of this new amplitude.

For example:

$$H = k*A$$

With k: constant, lying between 0 and 1.

A: last value of the amplitude of the magnetic field calculated on passing the last extremum.

If the value of the magnetic field passes below the value of the hysteresis, then the last extremum is validated as it is and the switching threshold is updated with this last extremum value.

The hysteresis threshold is first of all applied to the validation of the maximum values of the magnetic field, since these exhibit greater variability than the minimum values.

Specifically, in the case of an "out-of-roundness", it is the maximum values which vary above all. In other words, the last maximum measured is validated as it is only when the value of the magnetic field passes below the hysteresis value calculated with this last maximum value.

For as long as the magnetic field has not crossed the hysteresis threshold the new maximum is not validated, and the switching threshold applied to the magnetic signal B remains that calculated with the last maximum measured and validated.

However, if, for example, the value of the new maximum is much lower than the last maximum measured and validated, it is possible for the signal of the magnetic field to cross the switching threshold calculated previously with the last maximum measured and validated before even crossing the hysteresis threshold calculated with the new maximum.

This is illustrated in FIG. 2. At the top of FIG. 2, the variation in the value of the magnetic field B on the passage of a tooth D2 is shown. The switching threshold S1 of the tooth D2 is calculated according to the last maximum max1 and the last minimum min1 of the preceding tooth D1 which are measured and validated.

The new maximum of the tooth D2, max2, is smaller than the last maximum measured and validated max1, such that the hysteresis threshold $S_H$ calculated with the new maximum of the D2, max2, has a value that is lower than the switching threshold S1 calculated on the basis of the last maximum max1 and the last minimum min1. Once the signal of the magnetic field B has crossed the hysteresis threshold $S_H$, the switching threshold is calculated again on the basis of the new maximum max2 validated (and the last minimum min1) and the new switching threshold S2 is applied. The magnetic signal B then passes below the new switching threshold S2.

At the bottom of FIG. 2, the electrical signal Se representing the electrical rising and falling edges indicative of the passage of the magnetic signal B above or below the switching thresholds S1, S2 is shown.

The electrical signal Se consequently switches twice after passing the new maximum max2; once when the magnetic signal B passes below the switching threshold S1 and once when it passes below a new switching threshold S2. The electrical signal Se exhibits a parasitic pulse I indicative of the magnetic signal B successively passing these two thresholds S1, S2.

This parasitic pulse I skews the angular detection of the falling edge, since this is detected at the angle α2, corresponding to passing the switching threshold S1, while it should be detected at the angle α3, corresponding to passing the new switching threshold S2.

The presence of this parasitic pulse I at the output of the sensor may, for example, prevent the camshaft timing from being detected, when this is controlled by a VVT (variable valve timing) system.

SUMMARY OF THE INVENTION

An aspect of the present invention proposes a method for automatically calibrating a camshaft which makes it possible to alleviate this disadvantage. In this particular instance, the calibration method according to the invention allows the camshaft sensor to deliver an output signal that avoids the false detections of the prior art yet allows the "out-of-roundness" of a target and the "airgap defect" of the air gap between the sensor and the target to be determined and corrected.

An aspect of the invention proposes a method for automatically calibrating a motor vehicle engine camshaft sensor, said engine comprising at least one camshaft, a toothed coded target associated with this camshaft and a magnetic field sensor placed near the target to detect variations in magnetic field values induced by the passage of the teeth of the target in proximity to the sensor, said sensor measuring the values of the magnetic field and delivering an electrical signal indicative of teeth and troughs of the target according to a predetermined switching threshold dependent on the amplitude of the measured magnetic field and applied to rising edges and falling edges of the variations in the values of the magnetic field, the electrical signal having a high state after the passage of the values of the magnetic field above the switching threshold on a rising edge and a low state after the passage of the values of the magnetic field below the switching threshold on a falling edge, said method consisting in continuously measuring the value of the magnetic field, said method being noteworthy in that:

after the passage of the values of the magnetic field above the switching threshold on the rising edge and measuring a new maximum value of the magnetic field, the electrical signal remains in a high state for as long as the values of the magnetic field are higher than a hysteresis threshold, which is dependent on the amplitude of the magnetic field calculated with the measured new maximum value;

after the passage of the values of the magnetic field below the hysteresis threshold, a new switching threshold is calculated according to the new maximum value.

In a first embodiment, after the passage of the values of the magnetic field above the switching threshold on the rising edge and for as long as the values of the magnetic field are higher than the hysteresis threshold, the value of the switching threshold is decreased.

Preferably, after the passage of the values of the magnetic field above the switching threshold on the rising edge and for as long as the values of the magnetic field are higher than the hysteresis threshold, the value of the switching threshold is close to zero.

In a second embodiment, the electrical signal is controlled so as to remain in a high state after the passage of the values of the magnetic field above the switching threshold on the rising edge and for as long as the values of the magnetic field are higher than a hysteresis threshold, which is dependent on the amplitude of the magnetic field calculated with the measured new maximum value.

An aspect of the invention also relates to a motor vehicle engine camshaft sensor, said engine comprising at least one camshaft, a toothed coded target associated with this camshaft and a magnetic field sensor placed near the target to detect the magnetic field values induced by the passage of the teeth of the target near the sensor, said sensor continuously measuring the value of the magnetic field and delivering an electrical signal indicative of teeth and troughs of the target according to a predetermined switching threshold dependent on the amplitude of the magnetic field, said sensor being noteworthy in that it further comprises means for calculating a hysteresis threshold, means for monitoring the switching threshold and means for controlling the electrical signal.

Lastly, an aspect of the invention also applies to any motor vehicle comprising a camshaft sensor according to any one of the features enumerated hereinabove.

BRIEF DESCRIPTION OF THE DRAWINGS

Other features and advantages of the present invention will become more apparent from reading the following description, provided by way of non-limiting example and with reference to the appended drawings, in which.

DETAILED DESCRIPTION OF THE PREFERRED EMBODIMENTS

Figure 1:
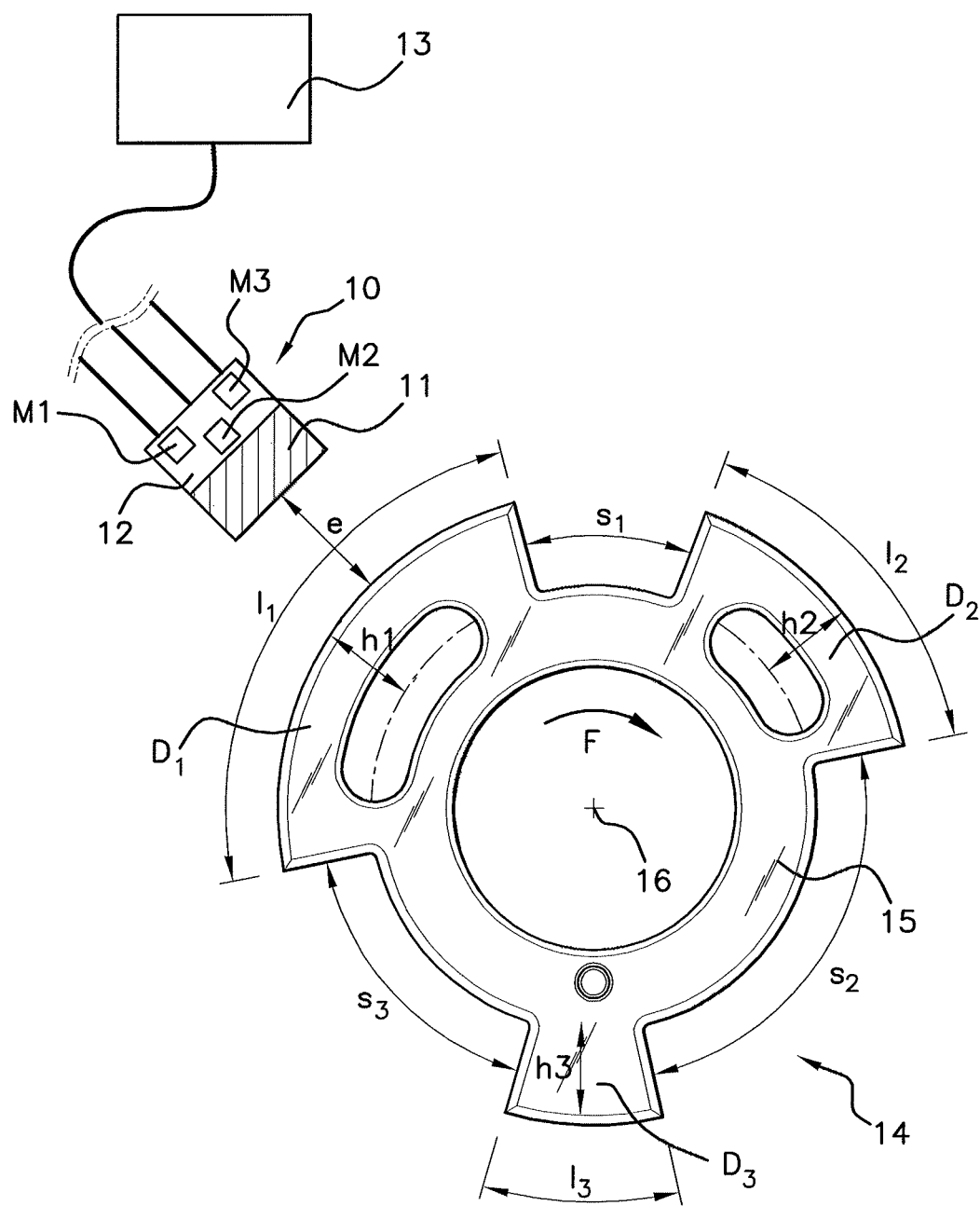
FIG. 1 is a schematic view in section depicting a camshaft sensor and its associated target.
Figure 2:
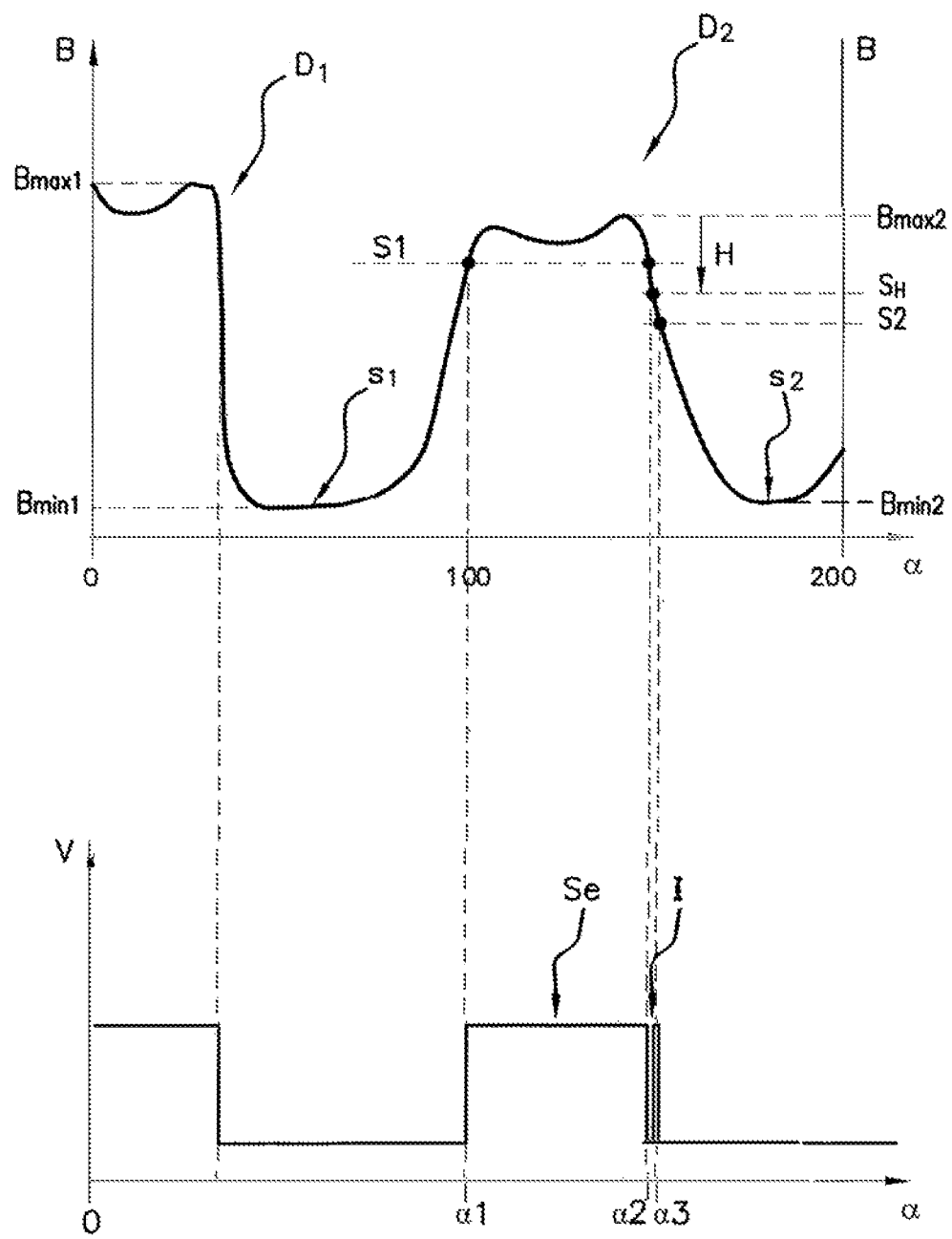
FIG. 2 illustrates an example of curves of the variation in the values of the magnetic field B perceived by a sensor associated with a target and the corresponding electrical signal Se, according to the prior art.
Figure 3:
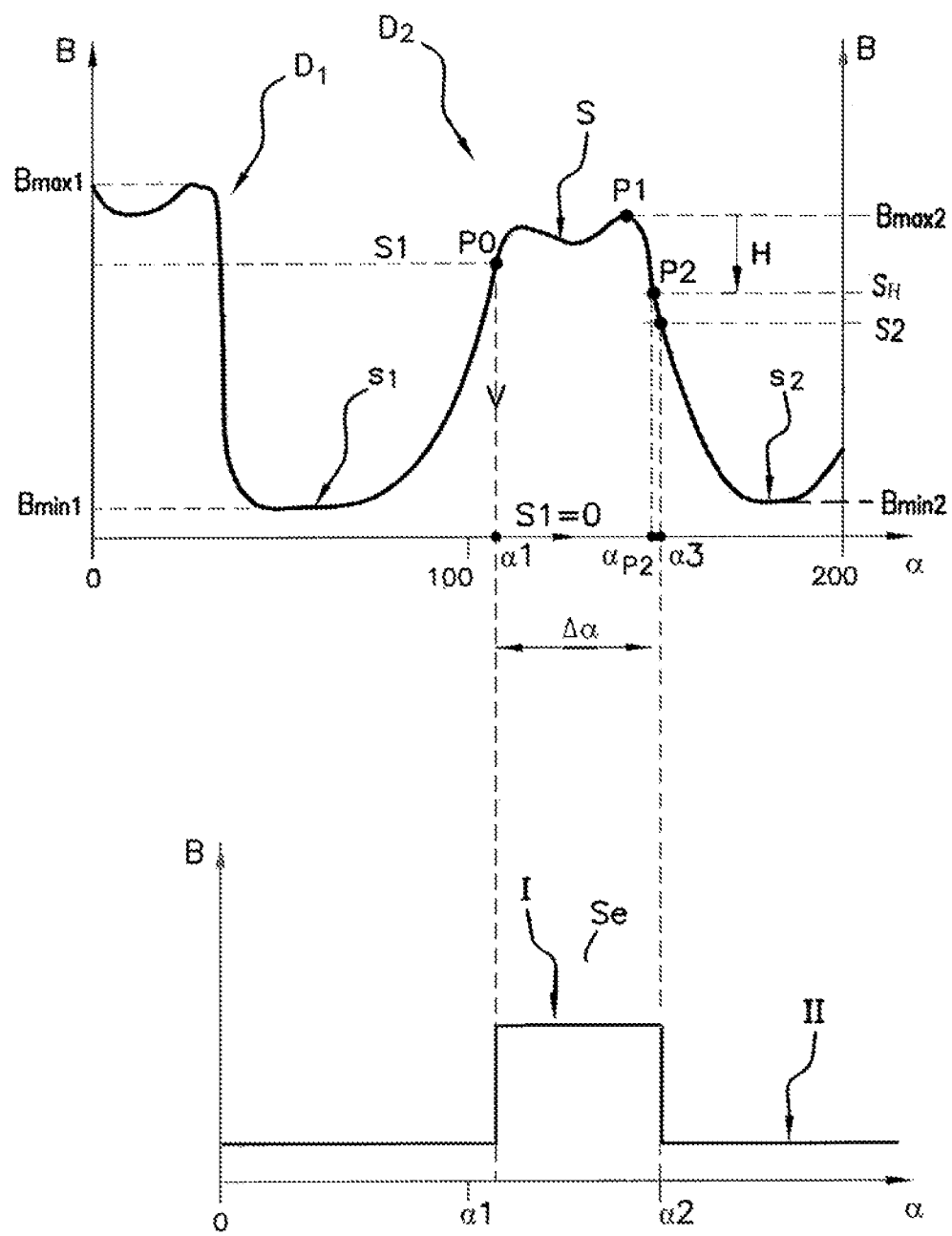
FIG. 3 illustrates an example of curves of the variation in the values of the magnetic field B perceived by a sensor associated with a target and the corresponding electrical signal Se, according to an aspect of the invention.

According to the embodiment described and depicted in FIGS. 1 to 3, a camshaft sensor 10 comprises a ferromagnetic element 11 and a magnetic field detection means 12 (for example a Hall-effect cell). This sensor 10 delivers a digital signal to a central processor 13.

A target 14 associated with this sensor 10 takes the form of a metal disk 15 firmly attached to a camshaft 16. This target bears, on its periphery, a plurality of teeth $D_1$, $D_2$, $D_3$ (3 in the example depicted) of different heights h1, h2, h3 and of variable lengths $l_1$ to $l_3$ and variable spacings (troughs) $s_1$ to $s_3$. These variable lengths and variable spacings in the way known per se constitute a coding.

The way in which a sensor 10 plus target 14 assembly works is described hereinafter.

When the target 14 is rotationally driven (arrow F FIG. 1) by the camshaft 16, the sensor 10 perceives a series of variations in values of the magnetic field B indicative of the length l of the teeth $D_1$, $D_2$, $D_3$ moving past it and of their spacings $s_1$, $s_2$, $s_3$. The curve thus obtained, for example during the first revolution of the target, is depicted in FIG. 2.

In this FIG. 2, the abscissa axis indicates the angles α of the engine cycle varying from 0° to 360° and the ordinate axis indicates the value B of the magnetic field perceived (field normalized as a function of air gap). As indicated in FIG. 2, for example, the teeth $D_1$, $D_2$ are not of the same height h1, h2 and the target 14 exhibits a small defect in its geometry. Because of this, the maximum field perceived by the sensor 10 as each of the teeth $D_1$, $D_2$ passes by varies for each of the two teeth and adopts the respective values Bmax1, Bmax2. Likewise, the minimum field perceived by the sensor 10 as each of the teeth $D_1$, $D_2$, $D_3$ passes by varies from tooth to tooth and adopts the respective values Bmin1, Bmin2. FIG. 2 shows the passage of two teeth $D_1$, $D_2$, the two first ($D_1$, $D_2$) corresponding to the geometry of the target 14 shown in FIG. 1 (the passage of the third tooth $D_3$ is not shown in FIG. 2).

It is known practice to detect the passage of a tooth edge as soon as the magnetic field B perceived rises above or drops below a predetermined switching threshold proportional to the amplitude of the field perceived during the passage of a tooth (75% of (Bmax1−Bmin1) for example).

The threshold values are embodied in FIG. 2 as dotted lines. After the first tooth $D_1$ has passed by, a switching threshold for the rising edge of the second tooth S1 is calculated, for example, using the following mathematical formula:

$$S1 = 0.75 * (B\text{max}1 - B\text{min}1)$$

Then, after the new maximum value of the magnetic field B upon passage of the second tooth Bmax2 has been crossed, a new switching threshold S2 is calculated, for example, for the falling edge of the second tooth $D_2$:

$$S2 = 0.75 * (B\text{max}2 - B\text{min}1)$$

This process is repeated, for the passage of each tooth, when a new maximum value or new minimum value of the magnetic field B has been measured and validated.

It should be noted that the maximum value and the minimum value of the magnetic field B for each tooth correspond to the last recorded and validated maximum and minimum values.

For example, in order to calculate the switching threshold for the rising edge of the second tooth S1, it is a matter of considering the last recorded maximum value and minimum value of the magnetic field B, that is to say Bmax1 and Bmin1, namely the maximum value and the minimum value of the magnetic field B after the passing of the first tooth $D_1$.

Similarly, in order to calculate the switching threshold for the falling edge of the second tooth S2, use is made of the last recorded maximum and minimum values, in this instance Bmin1 and Bmax2, namely the minimum value of the magnetic field B associated with the first tooth $D_1$ and the maximum value of the magnetic field associated with the second tooth $D_2$.

However, as explained above, in order to ensure that the last extremum measured, for example Bmax2, is indeed an extremum, a hysteresis H threshold $S_H$ is calculated on the passage of this extremum (Bmax2, cf. FIG. 2), and the new value of the switching threshold S2 is calculated according to this new extremum Bmax2 only when the hysteresis threshold $S_H$ has been crossed.

As a consequence, when the new maximum value Bmax2 is smaller than the last maximum value measured Bmax1, the magnetic signal B passes two successive switching thresholds S1 and S2, which results in a parasitic pulse I on the electrical signal Se.

In order to alleviate this disadvantage, the method for automatically calibrating the camshaft sensor according to an aspect of the invention proposes the following steps.

After the passage of the values of the magnetic field B above the switching threshold S1 on the rising edge and measuring a new maximum value Bmax2 of the magnetic field B, the electrical signal Se remains in a high state for as long as the values of the magnetic field B are higher than the hysteresis threshold $S_H$, which is dependent on the amplitude of the magnetic field B calculated with the measured new maximum value Bmax2.

After the passage of the values of the magnetic field B below the hysteresis threshold $S_H$, a new switching threshold S2 is calculated according to the new maximum value Bmax2.

The electrical signal Se therefore passes to a high state I as soon as the values of the magnetic field B pass above the switching threshold S1 on the rising edge and the electrical signal Se remains in the high state I for as long as a new maximum value Bmax2 has not been validated by the passage of the values of the magnetic field B below the hysteresis threshold $S_H$, which is calculated according to the new maximum value Bmax2.

Once the hysteresis threshold $S_H$ has been crossed, the new switching threshold S2 is calculated with the validated last maximum value Bmax2.

In one preferred embodiment, after the passage of the values of the magnetic field B above the switching threshold S1 on the rising edge, the value of the switching threshold S1 is decreased until it crosses the hysteresis threshold $S_H$. In other words, the value of the switching threshold S1 is set lower than its previously calculated value.

In another embodiment, the electrical signal Se is controlled so as to remain in a high state I as soon as the values of the magnetic field B pass above the switching threshold S1 on the rising edge and for as long as a new maximum value Bmax2 has not been validated by the passage of the values of the magnetic field B below the hysteresis threshold $S_H$, and to do so regardless of the value of the switching threshold S1 on the falling edge.

This is illustrated in FIG. 3, at the top of FIG. 3, showing the magnetic signal B on the passage of the second tooth D2.

After passing P0 the switching threshold S1, the threshold value S1 is decreased and is equal, in this example, to a value close to zero, until passing P2 the hysteresis threshold $S_H$.

After passing P2 the hysteresis threshold $S_H$, the new maximum value Bmax2 of the magnetic field is validated and the new switching threshold S2 is calculated according to this new maximum value Bmax2.

At the bottom of FIG. 3, the electrical signal Se at the output of the sensor 10 is illustrated, the magnetic signal B crossing only a switching threshold, more specifically the new switching threshold S2, on the falling edge, which signal passes from a high state I indicative of the tooth D2 to a low state II indicative of the trough $s_2$ at the angle $\alpha 2$ corresponding to passing the new switching threshold S2.

The electrical signal Se therefore does not exhibit a parasitic pulse; like in the prior art.

For this, the camshaft sensor 10 further comprises means M1 for calculating a hysteresis threshold (cf. FIG. 1) and means M2 for monitoring the switching threshold S1 so as to decrease the value of the switching threshold S1 after its crossing on a rising edge.

The sensor 10 further comprises means M3 for controlling the electrical signal Se in order to control the electrical signal Se so that it is in the high state after passing above the switching threshold S1 and for as long as the hysteresis threshold $S_H$ has not been crossed.

The means M1 for calculating a hysteresis threshold, the monitoring means M2 and the control means M3 are for example software means incorporated in the sensor 10 (cf. FIG. 1).

The method for automatically calibrating a camshaft sensor 10 according to an aspect of the invention therefore makes it possible to avoid parasitic pulses on the electrical signal during the successive passages of teeth having different maximum magnetic field values, in this instance when a tooth has a maximum value that is lower than that of the preceding tooth.

An aspect of the invention has been described and illustrated in the case in which the maximum value varies from tooth to tooth, specifically the "out-of-roundness" defect of the target affects the maximum value of the magnetic field above all, but aspects of the invention may also be applied to the variation in the minimum value of two successive teeth, in this instance when a minimum value of a trough is higher than the minimum value of the preceding trough.

The invention claimed is:

1. A method for automatically calibrating a camshaft sensor for a motor vehicle engine, said motor vehicle engine comprising:
    at least one camshaft,
    a toothed coded target associated with the camshaft, and
    a magnetic field sensor placed near the target to detect magnetic field variations induced by passage of the teeth of the target in proximity to the sensor, said sensor measuring values of the magnetic field and delivering an electrical signal indicative of teeth and troughs of the target according to a predetermined switching threshold dependent on an amplitude of the measured magnetic field and applied to rising edges and falling edges of the variations in the values of the magnetic field, the electrical signal having a high state after the passage of the values of the magnetic field above the switching threshold on a rising edge and a low state after the passage of the values of the magnetic field below the switching threshold on a falling edge, said method comprising continuously measuring the value of the magnetic field, wherein:
    after the passage of the values of the magnetic field above the switching threshold on the rising edge and measuring a new maximum value of the magnetic field, the electrical signal remains in a high state for as long as the values of the magnetic field are higher than a hysteresis threshold, which is dependent on the amplitude of the magnetic field calculated with the measured new maximum value;
    after the passage of the values of the magnetic field below the hysteresis threshold, a new switching threshold is calculated according to the new maximum value.

2. The automatic calibration method as claimed in claim 1, wherein after the passage of the values of the magnetic field above the switching threshold on the rising edge and for as long as the values of the magnetic field are higher than the hysteresis threshold, the value of the switching threshold is decreased.

3. The automatic calibration method as claimed in claim 2, wherein after the passage of the values of the magnetic field above the switching threshold on the rising edge and for as long as the values of the magnetic field are higher than the hysteresis threshold, the value of the switching threshold is close to zero.

4. The automatic calibration method as claimed in claim 1, wherein the electrical signal is controlled so as to remain in a high state after the passage of the values of the magnetic field above the switching threshold on the rising edge and for as long as the values of the magnetic field are higher than a hysteresis threshold, which is dependent on the amplitude of the magnetic field calculated with the measured new maximum value.

* * * * *